United States Patent [19]

Takuya

[11] Patent Number: 4,525,817

[45] Date of Patent: Jun. 25, 1985

[54] ACOUSTIC RESISTOR IN AN ELECTROACOUSTIC TRANSDUCER

[75] Inventor: Suzuki Takuya, Hamamatsu, Japan

[73] Assignee: Nippon Gakki Seizo Kabushiki Kaisha, Hamamatsu, Japan

[21] Appl. No.: 523,719

[22] Filed: Aug. 16, 1983

[30] Foreign Application Priority Data

Aug. 27, 1982 [JP] Japan ................................ 57-149002
Aug. 27, 1982 [JP] Japan ................................ 57-149003

[51] Int. Cl.[3] .......................... G01V 1/00; H04R 1/28

[52] U.S. Cl. .................................... 367/140; 367/178; 179/110 A

[58] Field of Search ............... 367/140, 178, 152, 188, 367/157; 179/110 A

[56] References Cited

FOREIGN PATENT DOCUMENTS 1412597 11/1975 Australia .

*Primary Examiner*—Nelson Moskowitz
*Assistant Examiner*—Ian J. Lobo
*Attorney, Agent, or Firm*—Spensley Horn Jubas & Lubitz

[57] ABSTRACT

An acoustic resistor placed at a tone aperture portion of an electroacoustic transducer is made of a mesh, a part of which is filled with a filler to create an acoustically opaque portion at which the acoustic resistor is secured to the tone aperture portion of the transducer. The acoustic impedance of the resistor is independent of whether it is secured to the transducer, since the non-filled part of the mesh is not altered when the resistor is attached to the transducer. The invention further makes it possible to obtain an acoustic impedance at the tone aperture portion which is independent of the accuracy in dimensions of the tone aperture by making an acoustic resistor in such a manner that the portion other than the acoustically opaque portion may be located within the tone aperture area.

10 Claims, 19 Drawing Figures

ACOUSTIC RESISTOR IN AN ELECTROACOUSTIC TRANSDUCER

BACKGROUND OF THE INVENTION (a) Field of the Invention

This invention relates to an acoustic resistor used in electroacoustic transducers such as mircrophones, loudspeakers, etc. and particularly to an acoustic resistor which is placed at a tone aperture portion of an electroacoustic transducer and serves to provide the acoustic impedance of the aperture portion with a proper acoustic resistance component. The invention relates also to a method for manufacturing such acoustic resistor.

(b) Description of the Prior Art

FIG. 1 shows the structure of a unidirectional dynamic microphone as an example of the electroacoustic transducer. In this figure, a magnet 1 is mounted on a bottom yoke 2 and they are entirely housed in a centering 3. A lateral side of the centering 3 is covered with a top yoke 4. A pole piece 5 located atop the magnet 1 is provided in such a manner that it projects from the centering 3. Above the pole piece 5 is located a diaphragm 7 provided with a voice coil 6. Above the diaphragm 7 is mounted a cover 8 serving also as a high frequency compensating adapter. A terminal board 10 is fixed to the bottom yoke 2 by a screw 9. Under the bottom yoke 2 is provided a cavity case 14.

In the above structure, acoustic resistors 11 are bonded to the cavity case 14 and top yoke 4 so as to cover their respective circular and rectangular tone apertures 12. The acoustic resistors 11 are made of felt, fabric materials or metallic nets of a large number of meshes, or the lake. Conventionally these materials were cut into a desired shape and size and bonded as such to cover the tone apertures 12. Thus, since the whole tone resistor 11 is made of a material offering an acoustic resistance, portions (indicated by a mesh) of the material constituting the acoustic resistor 11 where a bonding agent 13 has penetrated shown in FIG. 2 become acoustically opaque (i.e., unable to offer an acoustic resistance), thus altering the value of the acousitc resistance component originally intended to be afforded. Further, the area and volume of the portion which apparently contributes to the acoustic resistance vary according to the state of adhesion so that the same acoustic resistors 11 could afford different acoustic impedances after adhesion to peripheral portions of the tone apertures. Accordingly, precise adhesion is required and, therefore, the work efficiency is reduced. Further, since the whole acoustic resistor 11 is made of a material offering an acoustic resistance, the size of the tone aperture 12 constitutes a factor to determine the acoustic impedance so that errors in forming of the tone aperture portion result in variation of the acoustic impedance thereof even if uniformity in adhesion among the acoustic resistors is achieved.

SUMMARY OF THE INVENTION

An object of the present invention is to provide an acoustic resistor capable of affording a desired acoustic impedance to the tone aperture portion of an electroacoustic transducer.

Another object of the invention is to provide an acoustic resistor capable of affording to a tone aperture portion of the electroacoustic transducer an acoustic impedance independent of the state in which the acoustic resistor is adhered to the tone aperture.

Another object of the invention is to provide an acoustic resistor capable of affording to a tone aperture portion of the electroacoustic tranducer an acoustic impedance independent of the accuracy in dimensions of the tone aperture.

Another object of the invention is to provide the acoustic resistor realizing uniform acoustic impedance afforded to a tone aperture of the electroacoustic transducer, which is free from variations of the electroacoustic transducer products.

Another object of the invention is to provide an acoustic resistor capable of enhancing the work efficiency in securing the acoustic resistor to a tone aperture of the electroacoustic transducer.

To attain the objects stated above, the acoustic resistor according to the invention is constituted as follows. The acoustic resistor placed at the tone aperture portion of an electrocoustic transducer is made of a mesh a part of which is filled with a filler to create an acoustically opaque portion at which the acoustic resistor is secured to the tone aperture portion of the transducer, thereby developing an acoustic impedance independent of the state of adhesion.

The invention further makes it possible to obtain an acoustic impedance at the tone aperture portion which is independent of the accuracy in dimensions of the tone aperture by making an acoustic resistor in such a manner that the portion other than the acoustically opaque portion may be located within the tone aperture area.

In order to create the portion filled with a filler (acoustically opaque portion), a photo-engraving method is used.

BRIEF DESCRIPTION OF THE DRAWINGS

In the accompanying drawings.

DETAILED DESCRIPTION OF THE PREFERRED EMBODIMENT

Figure 1:
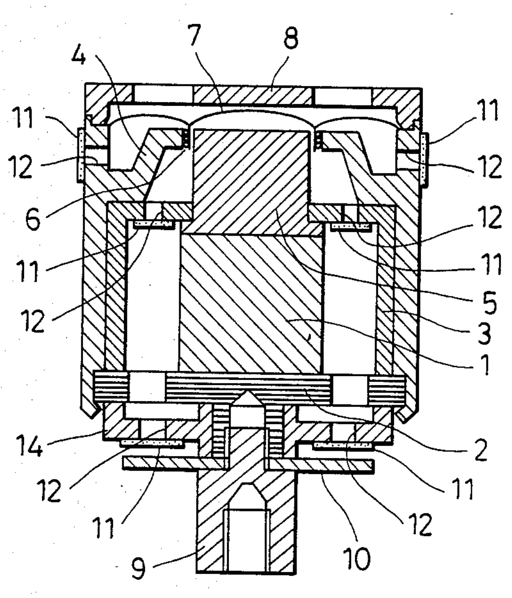
FIG. 1 PRIOR ART
FIG. 1 is a sectional view showing the structure of a conventional unidirectional dynamic microphone.
Figure 2:
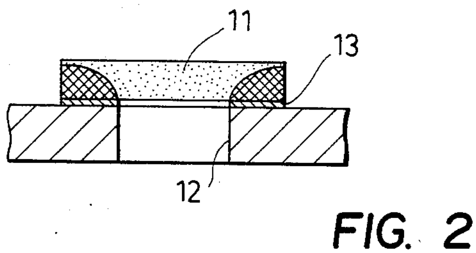
FIG. 2 PRIOR ART
FIG. 2 is a sectional view showing the structure whereby a conventional acoustic resistor 11 is secured.
Figure 3A:
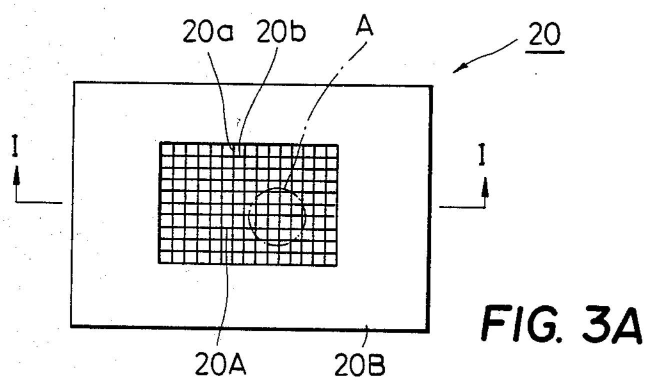
FIG. 3A is a top plan view showing an embodiment of the acoustic resistor according to the invention.
Figure 3B:
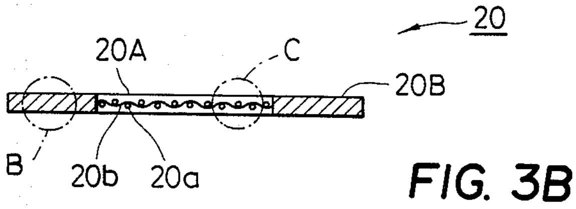
FIG. 3B is a sectional view along line I-13 I of FIG. 3A.
Figure 4:
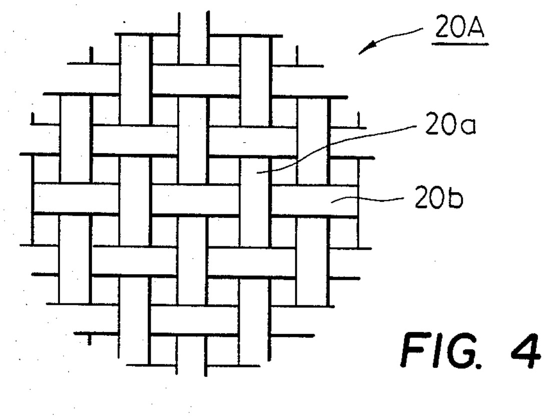
FIG. 4 is an enlarged view of the area encircled by an alternate long and short dash line A in FIG. 3A.
Figure 5:
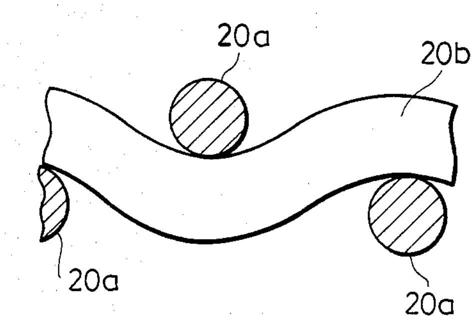
FIG. 5 is an enlarged view of the part encircled by an alternate long and short dash line C in FIG. 3B.
Figure 6:
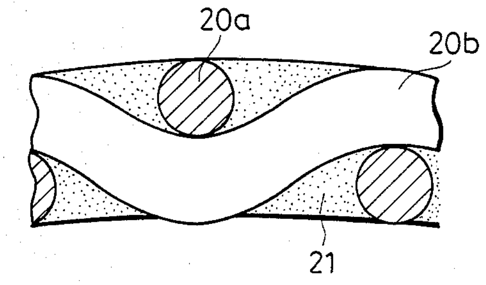
FIG. 6 is an enlarged view of the part encircled by an alternate long and short dash line B in FIG. 3B.
Figure 7:
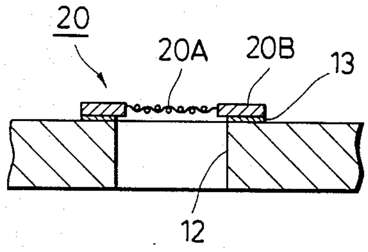
FIG. 7 is a sectional view showing the acoustic resistor 20 of FIG. 3A bonded to the peripheral portion of a tone aperture 12.

FIGS. 3A and 3B illustrate an embodiment of the acoustic resistor according to the invention used for a rectangular tone aperture. FIG. 3A is a top plan view and FIG. 3B a sectional view along line I—I of FIG. 3A. This acoustic resistor is made by weaving a warp 20*a* and weft 20*b* into, for example, a plain weave. The warp and weft may be natural fiber such as silk, or a synthetic resin fiber such as polyester and nylon or a metallic fiber such as a stainless fiber or a coated metallic fiber such as a nickel-coated stainless fiber or the like. As illustrated in FIG. 4 showing in an enlarged scale the art encircled by an alternate long and short dash line A of FIG. 3A and in FIG. 5 showing in an enlarged scale the part encircled by an alternate long and short dash line C of FIG. 3B, the rectangular acoustic resistor 20 has a central rectangular portion 20A where the mesh is exposed. This portion 20A is acoustically semiopaque and offers an acoustic resistance (this portion will be referred to as "acoustically resistant portion" below). The acoustic resistor 20 has a filled portion 20B around the acoustically resistant portion 20A, where the mesh is filled with a filler 21 which may be, for example, a synthetic resin, as illustrated in FIG. 6 showing in an enlarged scale the part encircled by an alternate long and short dash line B of FIG. 3B. This portion 20B is acoustically opaque (so will be referred to as "acoustically opaque portion" below). Accordingly, the value of the acoustic resistance component of the acoustic resistor 20 as a whole is determined by the denier value of the fiber forming the acoustically resistant portion 20A and the mesh number and area thereof. Therefore any desired value of the acoustic resistance component may be obtained by altering these denier value, mesh number and area. Besides the adhesion of the acoustic resistor 20 to the tone aperture portion at the acoustically opaque portion 20B protects the value of the acoustic resistance component from variation due to the adhesion since the bonding agent 13 does not penetrate into the acoustically resistant portion 20A, as shown in FIG. 7. Further, the location of the acoustically resistant portion 20A within the opening area of the tone aperture 12, as shown in FIG. 7, enables the acoustic impedance at the tone aperture portion to be determined irrespective of the tone aperture 12, thus making it possible to realize an acoustic impedance at the tone aperture which is determined solely by the acoustic resistor 20.

Figure 8A:
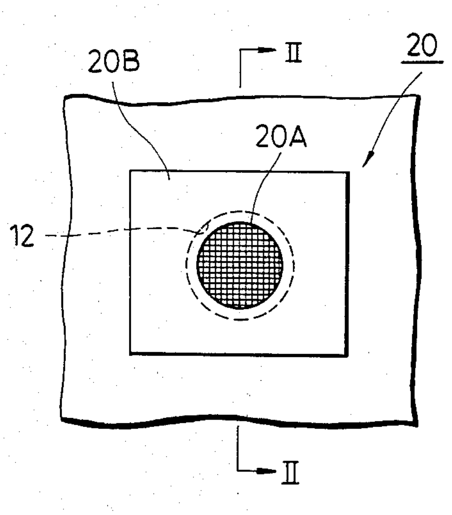
FIG. 8A is a top plan view showing another embodiment of the acoustic resistor 20 secured to the peripheral portion of a circular tone aperture 12.
Figure 8B:
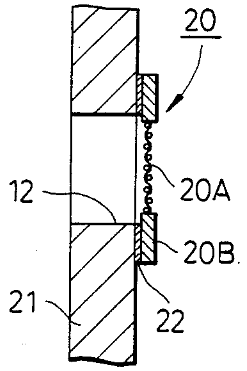
FIG. 8B is a sectional view along line II—II of FIG. 8A.

FIGS. 8A and 8B show an embodiment of the acoustic resistor used for a circular tone aperture 12, wherein the same reference numerals as used for the previous embodiment will be again used to designate corresponding parts, and detailed explanations for such parts will be omitted. FIG. 8A is a top plan view showing the acoustic resistor 20 secured to the peripheral portion of the circular tone aperture 12 and FIG. 8B a sectional view along line II—II of FIG. 8A. The acoustically resistant portion 20A is of a circular form having a smaller diameter than the tone aperture 12. The acoustically opaque portion 20B, made of a material which is acoustically opaque, surrounds the acoustically resistant portion 20A and is bonded to a member 21 defining the tone aperture 12 by a bonding agent 22.

Figure 9A:
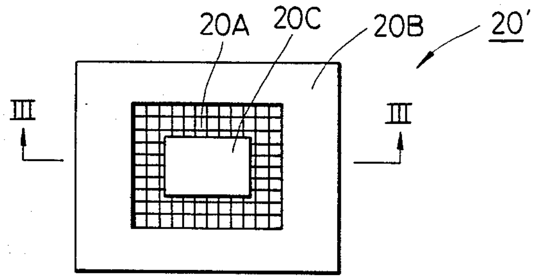
FIG. 9A is a top plan view showing another embodiment of the acoustic resistor according to the invention.
Figure 9B:
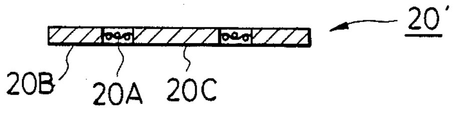
FIG. 9B is a sectional view along line III—III of FIG. 9A.

FIG. 9a and 9B show another embodiment of the acoustic resistor according to the invention. FIG. 9A is a top plan view and FIG. 9B a sectional view along line III—III of FIG. 9A. The acoustic resistor 20′ shown has an acoustically opaque portion 20c additionally provided by partially filling the mesh within said acoustically resistant portion 20A. In this embodiment, dimensions of the portion 20C are another elements which set the acoustic impedance of the tone apertures.

Figure 10:
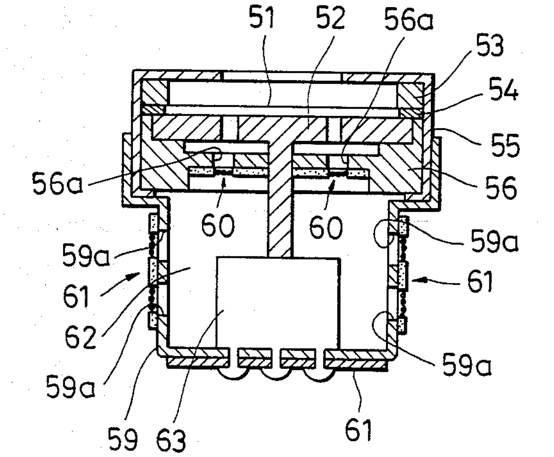
FIG. 10 is a sectional view showing an example where an acoustic resistor of the invention is used in a condenser microphone.

FIG. 10 shows an example where an acoustic resistor according to the invention is used in a condenser microphone. The condenser microphone shown is housed in cases 55 and 59. The case 59 has an output terminal member 61 on its outer bottom surface. An inner rear chamber 62 houses an impedance converter 63 from which projects an electrode 52. The case 55 houses an electrode holder 56 which supports the electrode 52. The electrode 52 opposes the diaphragm 51 via a spacer 54. The diaphragm 51 is fixed by means of a ring 53.

In the above structure, the electrode holder 56 and case 59 are provided with circular and rectangular tone apertures 56*a* and 59*a*, respectively. Acoustic resistors 60 and 61 according to the invention are bonded to the holder 56 and case 59 so as to cover those apertures.

Figure 11:
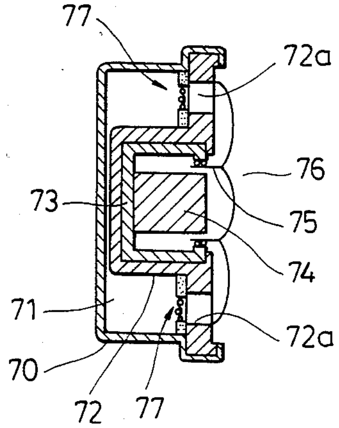
FIG. 11 is a sectional view showing an example where the acoustic resistor of the invention is used in a small speaker for headphones.

FIG. 11 shows an example in which an acoustic resistor according to the invention is utilized in a small speaker used in the headphones. The small speaker shown in FIG. 11 has a case 70 wherein a frame 72 is provided in a rear chamber 71. The frame 72 carries a yoke 73 and magnet 74 which are covered with a diaphragm 76 having a voice coil 75. An acoustic resistor 77 according to the invention is secured so as to cover a tone aperture 72*a* formed in the frame 72.

While the acoustic resistors are bonded to the tone apertures by a bonding agent in the above embodiments, they may instead be secured by a bilateral adhesive tape.

Now the direct, indirect and direct/indirect methods for producing the acoustic resistors mentioned above using a photographic technique will be described below.

(1) Direct Method

According to the direct method, a photosensitive emulsion (chromate emulsion, diazonium compound emulsion, etc.) is directly applied onto a mesh screen to form a photosensitive film and through exposure and development with water, create the pattern consisting of the acoustically resistant portion and acoustically opaque portion in the following steps:

1. To apply a photosensitive emulsion onto a mesh screen.

2. To apply a photosensitive liquid onto the mesh screen coated with the photosensitive emulsion.

Figure 12:
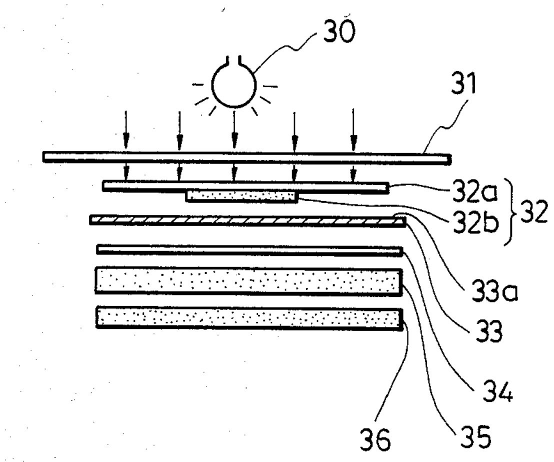
FIG. 12 shows an example of the manner in which an acoustic resistor according to the invention is produced by the direct and direct/indirect methods.

3. To place, as shown in FIG. 12, a glass sheet 31, a positive 32 with a pattern thereon (numeral 32*a* designates a film base and 32*b* a film), mesh screen 33, antihalation black paper sheet 34, sponge 35, and back sheet 36 for fitting, in the order shown in relation to the source of light 30 and fit the positive 32 over the photosensitive film 33*a* of the mesh screen 33 in close contact for exposure.

Figure 13:
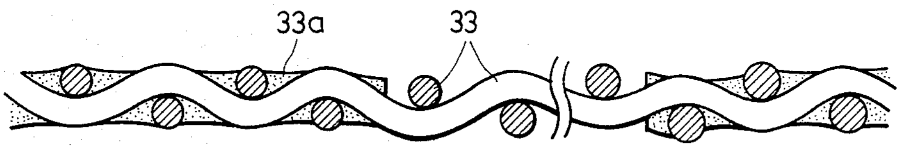
FIG. 13 is a sectional view showing an acoustic resistor produced by the direct method shown in FIG. 12.

4. To develop with water upon proper exposure, whereby the unexposed part of the photosensitive film 33*a* dissolves to uncover the mesh screen 33 whereas the exposed part remains on the mesh, filling it as shown in FIG. 13.

(2) Indirect Method

Figure 14:
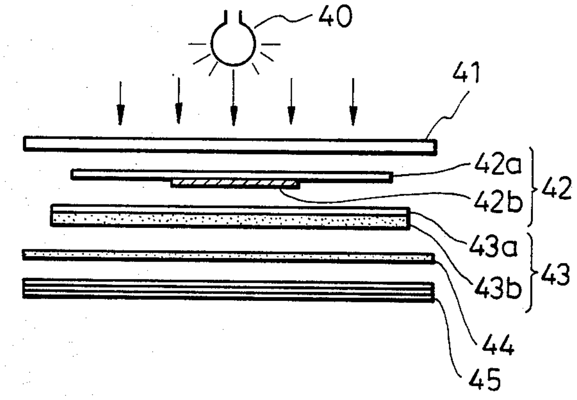
FIG. 14 is a sectional view showing an example of the manner in which an acoustic resistor according to the invention is produced by the indirect method.

According to the indirect method, in general a film (or paper) base that has been coated with a photosensitive emulsion is exposed and printed and, upon development, transfer onto a mesh screen is carried out in the following steps:

1. To place, as shown in FIG. 14, a glass sheet 41, positive 42 with a pattern thereon (numeral 42*a* designates a film base and 42*b* a film), film 43 (numeral 43*a* designates a film base and 43*b* a film), antihalation black paper sheet 44 and back sheet 45 for fitting, in the order shown in relation to the source of light 40, and fit the positive 42 closely over the film 43 for exposure.

2. To develop with water after proper exposure so that the unexposed part of the photosensitive film 43*b* on the film 43 dissolves whereas the exposed part remains.

Figure 15:
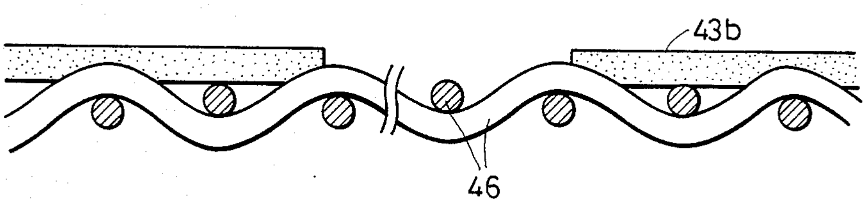
FIG. 15 is a sectional view showing an acoustic resistor produced by the indirect method shown in FIG. 14.

3. To bond the water-developed film 43 to a mesh screen and, upon drying, remove the film base 43*a*, thereby transferring the developed pattern onto the mesh screen as shown in FIG. 15, where numeral 46 designates the mesh screen and 43*b* the resulting coating to fill the mesh.

(3) Direct/Indirect Method

According to the direct method, an emulsion is directly applied to the mesh screen. According to the direct/indirect method, a film base having an emulsion applied thereon in advance as in the case of the indirect method is closely fitted over a mesh screen for transfer, followed by exposure and printing as in the case of the direct method. The direct/indirect method comprises the following steps;

1. To apply a photosensitive emulsion to film base.

2. To transfer the photosensitive emulsion applied in step 1 to a mesh screen.

3. To place, as in the case of the direct method, a glass sheet 31, positive 32 with a pattern thereon (numeral 32*a* designates a film base and 32*b* a film), a mesh screen 33, antihalation black paper sheet 34, sponge 35 and a back sheet for fitting in the order shown in relation to the source of light 30, and fit the positive 32 closely over the photosensitive film 33*a* of the mesh screen 33 for exposure.

Figure 16:
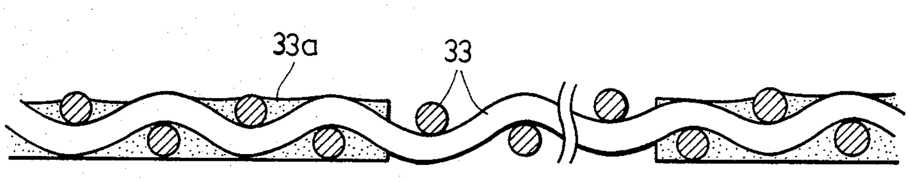
FIG. 16 is a sectional view showing an acoustic resistor produced by the direct/indirect method shown in FIG. 12.

4. To develop with water after proper exposure with the result that the unexposed part of the photosensitive film 33*a* dissolves to uncover the mesh screen 33 whereas the exposed part remains on the mesh and fills it. The completed acoustic resistor is shown in FIG. 16.

What I claim is:

1. An acoustic resistor provided on an electroacoustic transducer to cover each of tone apertures formed in said transducer, said acoustic resistor being formed of a mesh member having an acoustic resistance characteristic and comprising a filled portion which is filled with a filler surrounding a portion corresponding to said tone aperture, said filled portion being acoustically opaque and secured rigidly to the peripheral portion of said tone aperture, and an acoustic resistance component determined by the portion of the mesh member inside said filled portion being imparted to a tone aperture portion of said transducer.

2. An acoustic resistor as defined in claim 1 wherein the area of the portion inside of said filled portion is smaller than the area of opening of said tone aperture and the range of the portion inside of said filled portion is within the range of said tone aperture.

3. An acoustic resistor as defined in claim 2 wherein said filled portion is secured rigidly to the peripheral portion of said tone aperture by means of a bonding agent.

4. An acoustic resistor as defined in claim 1 which further comprises a second filled portion provided in the portion inside of said filled portion whereby the acoustic impedance of said tone aperture portion can be set in accordance with dimensions of said second filled portion.

5. An acoustic resistor provided on an electroacoustic transducer to cover each of tone apertures formed in said electroacoustic transducer, said acoustic resistor being formed of a mesh member having an acoustic resistance characteristic and comprising an acoustically resistant portion corresponding to said tone aperture and an acoustically opaque portion surrounding said acoustically resistant portion, said acoustically opaque portion being secured rigidly to the peripheral portion of said tone aperture, and an acoustic resistance component determined by said acoustically resistant portion of the mesh member being imparted to a tone aperture portion of said transducer.

6. An acoustic resistor as defined in claim 5 wherein the area of said acoustically resistant portion of said mesh member is smaller than the area of opening of said tone aperture and the range of said acoustically resistant portion is within the range of said tone aperture.

7. An acoustic resistor as defined in claim 6 wherein said acoustically opaque portion of said mesh member is secured rigidly to the peripheral portion of said tone aperture by means of a bonding agent.

8. An acoustic resistor as defined in claim 5 which further comprises a second acoustically opaque portion provided in said acoustically resistant portion whereby the acoustic impedance of said tone aperture portion can be set in accordance with dimensions of said second acoustically opaque portion.

9. An acoustic resistor for covering a tone aperture of an electroacoustic transducer, comprising:

a mesh portion; and an acoustically opaque portion surrounding the mesh portion, wherein the opaque portion is secured to the periphery of a tone aperture;

wherein the acoustic resistor has an acoustic resistance component determined by the mesh portion.

10. An acoustic resistor as in claim 9 wherein the opaque portion is comprised of an extension of the mesh portion and a filler filling the extension.

* * * * *